United States Patent
Shiban

(12) 
(10) Patent No.: US 8,634,051 B1
(45) Date of Patent: Jan. 21, 2014

(54) SURFACE WIND DISRUPTERS AND BARRIERS

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 0 days.

(21) Appl. No.: 13/435,273

(22) Filed: Mar. 30, 2012

(51) Int. Cl.
*E06B 3/26* (2006.01)

(52) U.S. Cl.
USPC ............... 352/202; 52/DIG. 9; 404/6; 404/10

(58) Field of Classification Search
USPC ............. 52/84, 97, DIG. 9, 202; 404/6, 9, 10; 256/13.1
See application file for complete search history.

(56) References Cited

U.S. PATENT DOCUMENTS

| | | | | |
|---|---|---|---|---|
| 3,661,359 A * | 5/1972 | Walker | | 256/1 |
| 3,953,977 A * | 5/1976 | Kikui et al. | | 405/27 |
| 4,022,452 A * | 5/1977 | Dupre | | 267/140 |
| 4,030,706 A * | 6/1977 | Ward | | 256/1 |
| 4,066,244 A * | 1/1978 | Yoho | | 256/1 |
| 4,785,577 A * | 11/1988 | Lederbauer | | 47/33 |
| 5,097,785 A * | 3/1992 | Zidek | | 114/219 |
| 5,178,489 A * | 1/1993 | Suhayda | | 405/21 |
| 5,645,368 A * | 7/1997 | Yunick | | 404/6 |
| 5,820,295 A * | 10/1998 | Buteaux | | 405/21 |
| 6,604,888 B2 * | 8/2003 | Dolan | | 404/6 |
| 6,905,281 B2 * | 6/2005 | Kang | | 404/6 |
| 7,066,684 B1 * | 6/2006 | Bourgeois | | 405/35 |
| 7,387,295 B2 * | 6/2008 | Talbott | | 256/13.1 |
| 7,410,320 B2 * | 8/2008 | Faller et al. | | 404/6 |
| 7,575,396 B2 * | 8/2009 | Cederlund | | 405/27 |
| 7,918,622 B2 * | 4/2011 | Whitford | | 404/6 |
| 2003/0081997 A1 * | 5/2003 | Kramer | | 404/6 |
| 2003/0103808 A1 * | 6/2003 | Dolan | | 404/6 |
| 2003/0210954 A1 * | 11/2003 | Kang | | 404/6 |
| 2005/0236609 A1 * | 10/2005 | Talbott | | 256/1 |
| 2010/0290833 A1 * | 11/2010 | Whitford | | 404/6 |
| 2012/0014747 A1 * | 1/2012 | Yu | | 405/25 |
| 2013/0017015 A1 * | 1/2013 | Chae | | 404/6 |

* cited by examiner

*Primary Examiner* — Brian Glessner
*Assistant Examiner* — Adam Barlow
(74) *Attorney, Agent, or Firm* — James Creighton Wray

(57) ABSTRACT

A hurricane and tornado surface wind pattern disrupter and vehicle barrier has carbon steel plates, each mounting plural used tires. Tires are connected to opposite sides of the mounting plates with bolts, washers and nuts. The bolts extend through sidewalls of the tires or through gripper strips in slots in the plates. Ends of gripper strips hold the tire walls against the plates. Clamps connected to the bolts engage inner walls of the tires and hold the tires against the plates. Lateral edges of the plates are positioned inward from the tires. Downward extensions of the mounting plates are connected to fixed reinforced structures. When the plates are connected to tops of lane dividing jersey wall sections, the plates and tires assemblies form a continuously interrupted wall or ribbon for interference with strong surface wind patterns and for disruption and diminution of the wind forces.

15 Claims, 6 Drawing Sheets

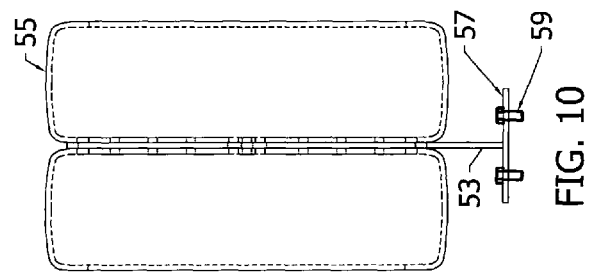
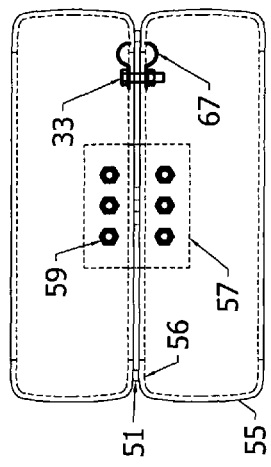
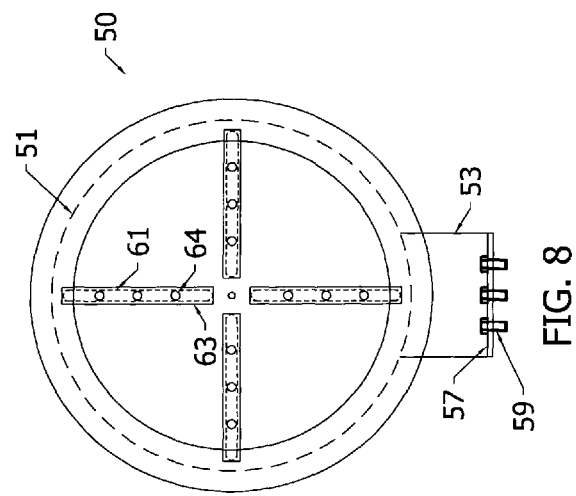
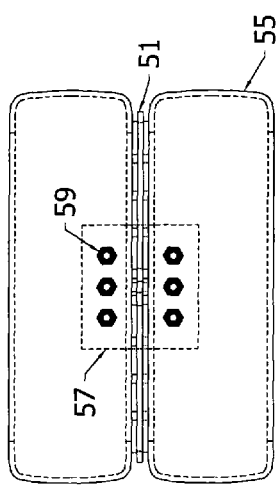

SURFACE WIND DISRUPTERS AND BARRIERS

BACKGROUND OF THE INVENTION

Cyclones, hurricanes and tornadoes produce strong blustery and swirling surface winds. The surface winds damage houses, buildings, crops and vehicles. Automobiles, trucks and boats suffer from the damaging surface winds. Tracks of some smaller tornadoes have been known to follow linear surface anomalies such as fences and tree lines. Searches continue for solutions to even minutely avoid injuries, deaths and property losses.

Needs exist for surface wind pattern disrupters.

SUMMARY OF THE INVENTION

The present invention counters and disrupts surface high wind velocities, and disrupts surface wind patterns of cyclones, hurricanes and tornadoes. The invention provides vehicle deflecting apparatus. Main vertical plates have downward extending support attachments connected to lower ends of the vertical plates. Gussets are connected between lower ends of the vertical plates and welded horizontal support plates and brackets. Plural used tires are connected to the vertical plates. The side walls of the tires are connected to the plates with washers, nuts and bolts extending through the tires and plates. The toroidal cupped shapes of the used tires redirect and deenergize the surface winds.

In one embodiment, three used tires are mounted on both sides of each vertical plate. The tires are mounted separately on sides of the vertical plate. The plate and tire assemblies are mounted in a long ribbon, for example on tops of jersey walls, for surface wind interruption.

Two or more tires are mounted on a vertical plate. The tires are connected on opposite sides of the plate.

More than two tires are mounted on each side of the vertical plate. Three tires are mounted on each side of the vertical plate in one embodiment.

The downward extended support attachments on the plates are connected to anchors.

The anchors are interconnected reinforced concrete or jersey walls and anchor bolts extending through holes in the support attachments and into the reinforced concrete.

The apparatus is adapted for interrupting high wind patterns.

The apparatus is adapted for deenergizing, redirecting and deflecting hurricanes and tornadoes.

The apparatus is also adapted for deenergizing, redirecting and deflecting errant off-path vehicles.

Tire anchoring bolts extend through washers and nuts, through clamps or gripper strips through aligned holes in the tires or the plates. When many assemblies are mounted on long rails, railings, curbs or jersey walls, surface wind patterns and wind velocities are interrupted by the circulating of air in and around the tires.

These and further and other objects and features of the invention are apparent in the disclosure, which includes the above and ongoing written specification, with the claims and the drawings.

BRIEF DESCRIPTION OF THE DRAWINGS

FIG. 8 is a front elevation of two tires mounted on a mounting plate with slots and grip strips to allow tires of various sizes to fit on the mounting plate.

FIG. 9 is a plan view of the tires and mounting plate, grip strips, support and anchor bolts shown in FIG. 8.

FIG. 10 is a right side elevation of the mounting plate with two tires shown in FIGS. 8 and 9.

FIG. 11 is a plan view of an alternate clamping structure for the tires on the mounting plate shown in FIGS. 8-10.

DETAILED DESCRIPTION OF THE DRAWINGS

Figure 1:
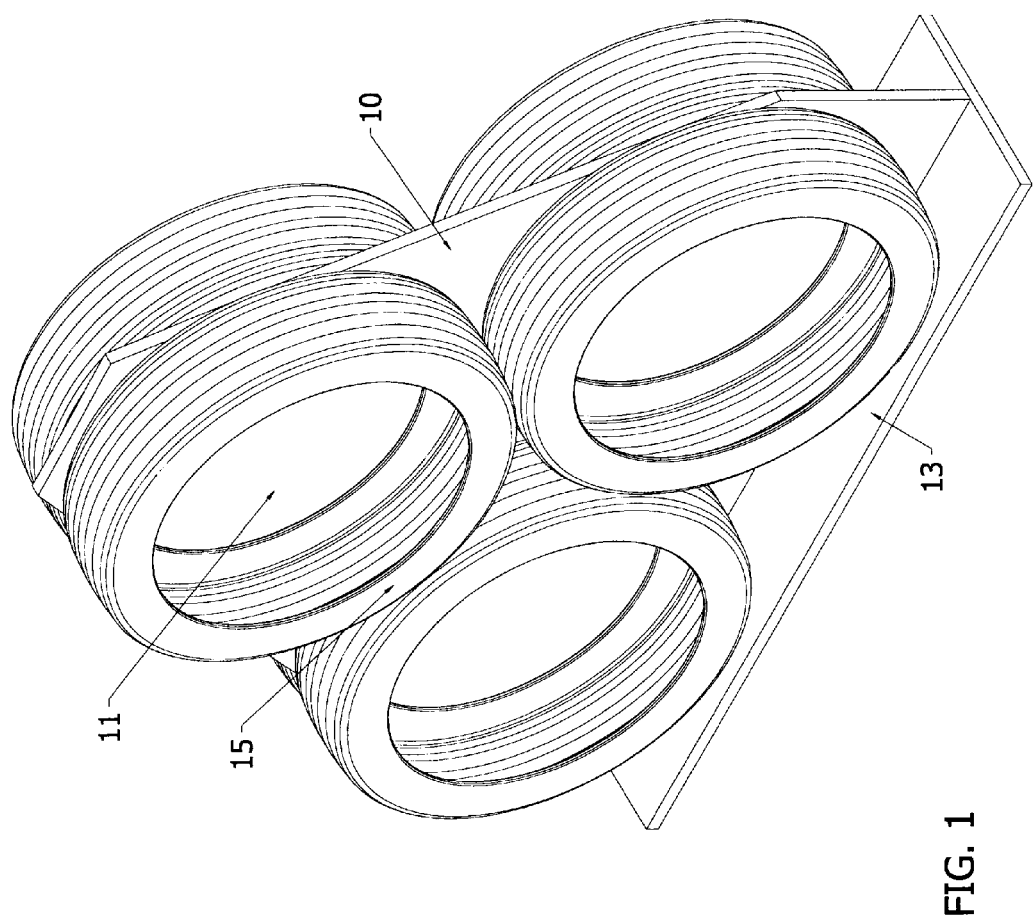
FIG. 1 is a perspective view of the six-tire mounting plate with the six tires and the horizontal attachment plates welded at the bottom of the mounting plate

A six-tire mounting plate and base support with six mounted tires is shown as an assembly 10 in FIG. 1. Mounting plate 11 has a generally truncated triangular form. Base plate 13 welded on the bottom of plate 11 extends from both sides of the mounting plate 11. Tires 15 are attached on both sides of the mounting plate 11 with anchor bolts which extend through the mounting plate. Base plate 13, which extends from both sides of the bottom of the mounting plate 11, has holes for receiving anchor bolts which attach the base plate and the mounting plate to a fixed structure. The fixed structure, for example, may be precast connected and reinforced jersey wall sections to which assemblies 10 are connected.

The assembly 10 shown in FIG. 1 interrupts, disrupts and redirects wind currents and de-energizes high winds and circular wind patterns of hurricanes and tornadoes. Assemblies 10 when mounted in a regular spaced pattern along the roadway edges and when affixed to the tops of jersey wall sections also help to prevent vehicles from running off roads or into opposite direction lanes.

Figure 4:
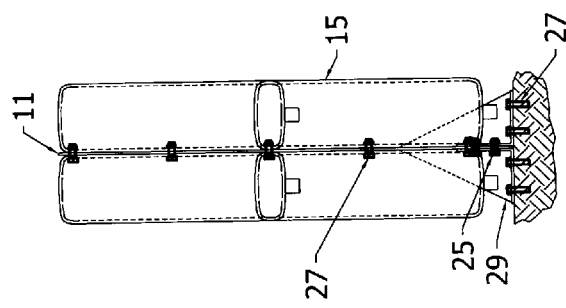
FIG. 4 is a right side elevation of the six-tire mounting plate with the tires, plate and support.
Figure 3:
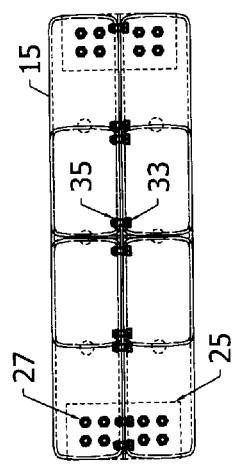
FIG. 3 is a plan view of the six-tire mounting plate and the tires shown in FIGS. 1 and 2.
Figure 2:
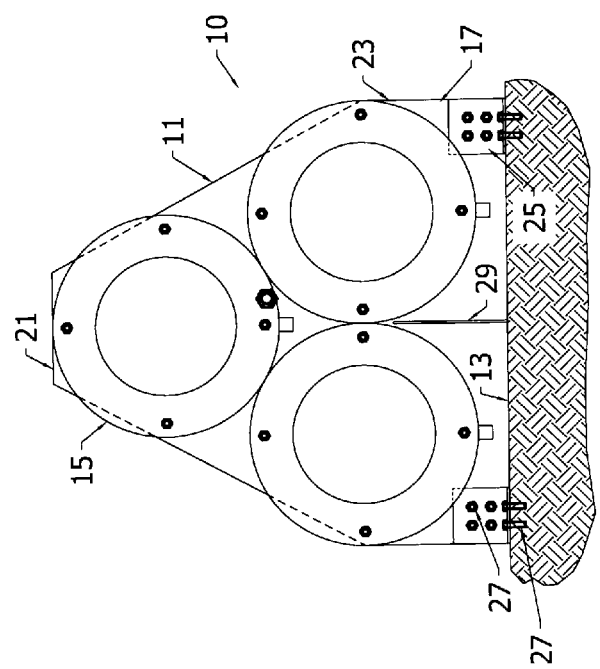
FIG. 2 is a front elevation of the six-tire mounting plate of FIG. 1 showing three tires mounted on one side of the plate.

The assembly 10 is shown in FIGS. 2-4. The generally triangular form on the mounting plate 11 has a truncated top 21 and vertical sides 23. Base 13 has four angle iron brackets 25 at the corners. Opposite brackets 25 are secured with anchor bolts 27 extending horizontally through corner portions 17 of the mounting plate 11. Gusset plates 29 which have triangular form are welded to the opposite sides of the mounting plate 11 and to the base plate 13. Long anchor bolts 31 attached the base plate and the angle iron brackets 25 anchor the assemblies to reinforced concrete rigid structures. Tires 15 are connected to the mounting plate 11 with anchor bolts 33, washers 34 and nuts 35. Bases 13 are fixed to rigid objects such as concrete curbs or interconnected jersey wall road dividers. Washers are used both opposite insides of the tires 15. The bolts 33 extend through washers, holes in the tires, holes in the mounting plate, holes in the opposite tires and washers and nuts 35 inside the tires 15 on the opposite side of the mounting plate 11.

Figure 7:
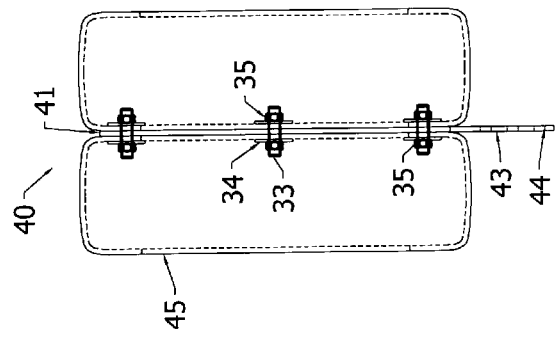
FIG. 7 is the right side elevation of the two-tire mounting plate and tires shown in FIGS. 5 and 6.
Figure 6:
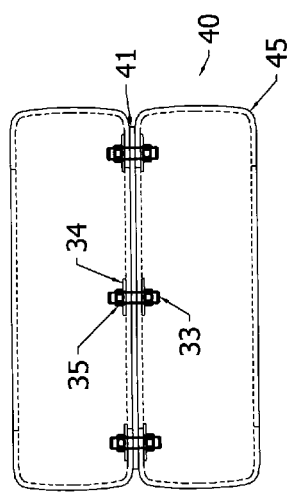
FIG. 6 is a plan view of the two-tire mounting plate and tires shown in FIG. 5.
Figure 5:
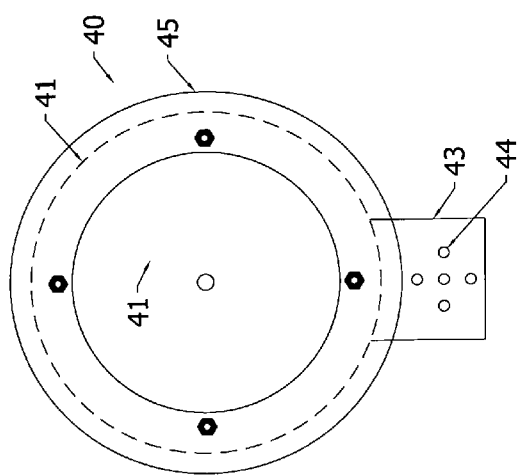
FIG. 5 is a front elevation of a two-tire mounting plate and the tires.

Two-tire mounting plate assemblies 40 are shown in FIGS. 5-7. Mounting plates 41 have a generally circular shape. The diameter of each mounting plate is no greater than the internal diameter of the tire 45 which is mounted on both sides of the mounting plate. The carbon steel mounting plate 41 has a lower support extension 43, which has holes 44 for connecting the mounting plate 41 and tires 45 to a fixed structure.

Tires 45 are shown mounted on opposite sides of the mounting plate 41 using bolts 33 and washers 34 and nuts 35 on the insides of both tires 45. Mounting plate 41 with attachment 43 is made of the carbon steel plate. The carbon steel mounting plates 41 with attachments 43 and the tires mounted repetitively along a fixed object such as reinforced and interconnected concrete jersey wall sections interrupt and redirect wind currents and de-energize high wind currents and circular wind patterns of hurricanes and tornadoes. When mounted along highways the mounting plates and fixed tires engage and redirect vehicles on errant paths back into the roadway surfaces.

As shown in FIGS. 8 through 10, plate and tire assemblies 50 have mounting plates 51 with attachment extensions 53 and flat horizontal bases 57. The diameters of the mounting plates 51 are no greater than the internal diameters of the tires which are mounted on the mounting plates. The two adjacent tires form a large surface for wind resistance and interruption, and the extended tire surfaces beyond the plate edges 52 prevent unintended contact with sides of the plates 51. Anchor bolts 59 of extended lengths secure the bases, attachment extensions and plates to fixed structures such as for example tops of jersey walls. Mounting plate 51 is slotted 61 to receive grip strips 63 that fit internal diameters of various tire sizes. The quarter inch thick steel grip strips 63 have holes 64 which receive anchor bolts 33 extending through the holes 64 in the gripper strips 63 to be connected to the gripper strips on opposite sides of the plate 21. Outer end portions of the gripper strips 63 clamp the inner rim edge portions 56 of the tires 55 to the mounting plates 51.

In FIG. 11 anchor bolts 33 extending through the outermost holes 64 in the grip strips 63 have extending clamping devices 67 which engage the inner surfaces of edge portions 56 of the tires 55 to hold the tires assembled on the plate 51.

Figure 14:
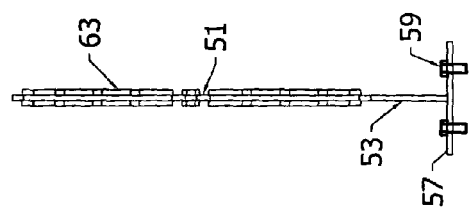
FIG. 14 is a right side elevation of the mounting plate support and grip strips shown in FIGS. 12 and 13.
Figure 13:
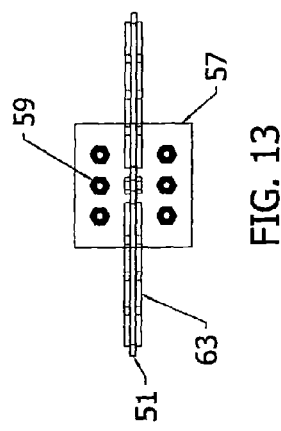
FIG. 13 is a plan view of the mounting plate support and grip strips shown in FIG. 12.
Figure 12:
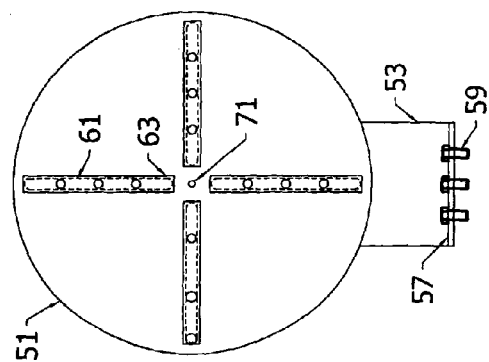
FIG. 12 is a front elevation of the mounting plate, base, support and grip strips which are adjustable to fit the internal diameters of various tire sizes.

FIGS. 12-14 show the mounting plate 51 slots 61 and grip strips 63. The attachment portion 53 of the mounting plate 51 extends downward from the mounting plate and is welded to a base 57 which has holes for receiving long anchor bolts 59. A central hole 71 extends through the mounting plate 51 to allow the mounting plate to be connected to other mounting plates with cables extending through the holes 71 or to allow the mounting plate 51 to be mounted and connected to a fixed structure. The central holes 71 also provide for attachments of signs or information to the mounting plates.

Figure 16:
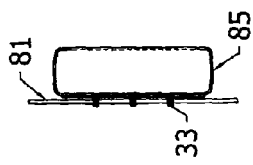
FIG. 16 is a right side elevation of the mounting plate and tires shown in FIG. 15.
Figure 15:
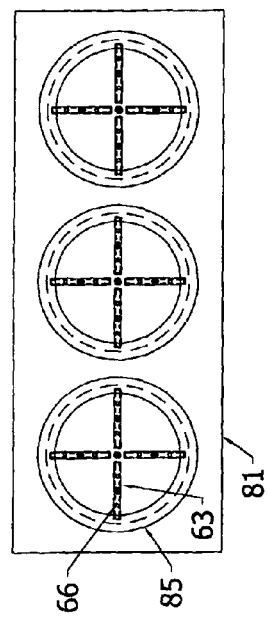
FIG. 15 is an elevation of a three tire mounting plate with anchor bolts and grip strips holding the tires on the plate.

FIGS. 15 and 16 show an alternate mounting plate 81, which is horizontally elongated to mount three tires 85. Tires 85 are mounted on plate 81 with mounting strips 63 in grooves 61 similar to those shown in FIGS. 12 through 14 and 8 through 10. Anchor bolts 33 extend through the holes in the grip strips 63. Outer edge portions 66 of the gripper strips 63 engage the inner surfaces of edge portions of the tires 85.

Figure 19:
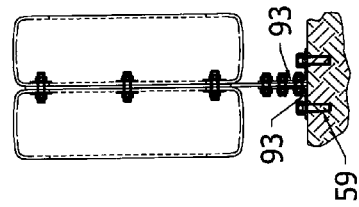
FIG. 19 shows angle irons holding the downward attachment on the top of a concrete jersey wall lane divider.
Figure 21:
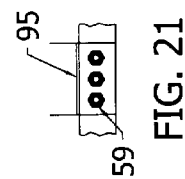
FIGS. 20 and 21 show a channel iron welded on the bottom of the downward attachment to anchor the tire holding plate on a rail or railing.
Figure 17:
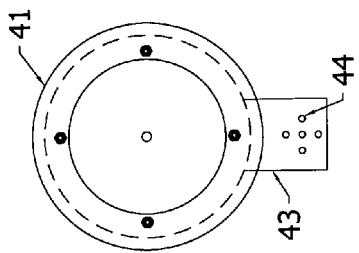
FIG. 17 shows a tire on a tire mounting plate with an extended downward attachment similar to the assembly shown in FIGS. 5-7.
Figure 20:
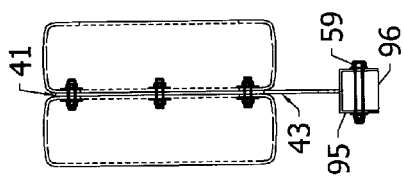
Figure 18:
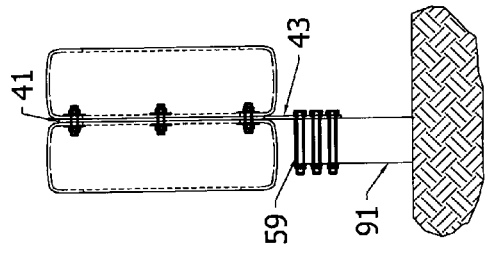
FIG. 18 shows the downward extended attachment plate connected to a round or square post or pipe.

FIGS. 18 through 21 show different mounts for connecting the attachment plate portions 43 of the mounting plates 41 shown in FIGS. 5 through 7 and 17 to fixed structures. FIG. 18 shows the mounting plate 41 and attachment plate portion 43 attached to a round or square post or pipe 91 with long anchor bolts 59. FIG. 19 shows two angle irons 93 on opposite sides of the attachment portion 43, with anchor bolts and nuts extended through the holes 44 in the attachment portion and complementary holes in the angle irons 93. Long anchor bolts 59 attach the angle irons 93 to the top of a concrete divider, also known as a jersey wall. A rail mount is shown in FIGS. 20 and 21. A channel iron 95 is welded to the bottom of the attachment portion 43. The channel iron 95 is attached with long anchor bolts 59 washers and nuts to a rail or railing 96, for example a 4 inch railing. The railing may represent an anchored curb or gutter or an iron railing anchored in a reinforced cement base. FIG. 21 is a section through line A-A of FIG. 20.

While the invention has been described with reference to specific embodiments, modifications and variations of the invention may be constructed without departing from the scope of the invention, which is defined in the following claims.

I claim:

1. Apparatus comprising
a main vertical mounting plate,
at least one attachment extension connected to a lower end of the vertical mounting plate, and
a plurality of used tires separately and rigidly connected to a surface of the vertical mounting plate,
the plurality of tires and the vertical mounting plate are attached to rigid reinforced stabilized objects, and wherein the vertical mounting plate is mounted on the top of the rigid reinforced stabilized objects by the attachment extension at the lower end of the vertical mounting plate.

2. The apparatus of claim 1, wherein three used tires are mounted on one side of the vertical mounting plate.

3. The apparatus of claim 1, wherein the plural used tires are mounted on one side of the vertical mounting plate.

4. The apparatus of claim 1, wherein more than two used tires are mounted on the vertical plate.

5. The apparatus of claim 1, wherein the used tires are connected on opposite sides of the mounting plate and the vertical mounting plate has a generally truncated triangular shape.

6. The apparatus of claim 1, wherein more than two tires are mounted on each side of the vertical plate.

7. The apparatus of claim 1, wherein three tires are mounted on each side of the vertical plate.

8. The apparatus of claim 1, wherein the attachment extensions are connected to anchors.

9. The apparatus of claim 8, wherein the anchors are connected to interconnected reinforced concrete structures or jersey walls, wherein the anchors are long bolts extending through holes in the attachment extensions and into the reinforced concrete structures.

10. The apparatus of claim 1, wherein the apparatus is adapted for interrupting high velocity surface wind patterns.

11. The apparatus of claim 10, wherein the apparatus is adapted for deenergizing, redirecting and deflecting hurricanes and tornadoes.

12. The apparatus of claim 1, wherein the apparatus is adapted for deenergizing redirecting and deflecting errant off-path vehicles.

13. The apparatus of claim 12, further comprising tire mounting bolts extending through nuts and washers, clamps or strips and aligned holes in the used tires and the mounting plate.

14. A method of using the apparatus of claim 1, the method comprising: firmly anchoring and positioning a plurality of mounting plates with attached used tires on long reinforced concrete or steel structures, wherein mounting the plates on long reinforced concrete or steel structures counters and disrupts high surface wind velocities, and disrupts surface wind patterns of cyclones, hurricanes, and tornadoes.

15. A method comprising firmly anchoring and positioning multiple mounting plates with attached used tires as described in claim 1 on long reinforced concrete or steel structures for deenergizing redirecting and deflecting errant off-path vehicles.

\* \* \* \* \*